United States Patent
Ugawa

(10) Patent No.: US 8,178,237 B2
(45) Date of Patent: May 15, 2012

(54) NON-AQUEOUS ELECTROLYTE BATTERY AND NEGATIVE ELECTRODE

(75) Inventor: Shinsaku Ugawa, Fukushima (JP)

(73) Assignee: Sony Corporation, Tokyo (JP)

( * ) Notice: Subject to any disclaimer, the term of this patent is extended or adjusted under 35 U.S.C. 154(b) by 544 days.

(21) Appl. No.: 12/392,779

(22) Filed: Feb. 25, 2009

(65) Prior Publication Data

US 2009/0214949 A1    Aug. 27, 2009

(30) Foreign Application Priority Data

Feb. 26, 2008  (JP) ................. P2008-044685

(51) Int. Cl.
*H01M 4/13*    (2010.01)
(52) U.S. Cl. ...................................... 429/217
(58) Field of Classification Search .......... 429/212, 429/217
See application file for complete search history.

(56) References Cited

U.S. PATENT DOCUMENTS

2008/0292969 A1* 11/2008 Mori et al. ............ 429/303

FOREIGN PATENT DOCUMENTS

| JP | 4-332479 | 11/1992 |
|---|---|---|
| JP | 2004-095538 | 3/2004 |
| JP | 2005-327630 | 11/2005 |
| JP | 2006-190679 | 7/2006 |
| JP | 2007-258127 | 11/2007 |

OTHER PUBLICATIONS

Japanese Office Action for corresponding JP2008-044685 dated Feb. 2, 2010.

\* cited by examiner

*Primary Examiner* — Patrick Ryan
*Assistant Examiner* — Muhammad Siddiquee
(74) *Attorney, Agent, or Firm* — K&L Gates LLP

(57) ABSTRACT

A non-aqueous electrolyte secondary battery including a positive electrode, a negative electrode and a non-aqueous electrolyte, wherein the negative electrode contains a negative electrode mixture containing a binder; and the binder contains polyvinylidene fluoride and polyacrylonitrile, with a mass ratio of polyvinylidene fluoride to polyacrylonitrile ranging from 99.9/0.1 to 95.1/4.9.

8 Claims, 2 Drawing Sheets

NON-AQUEOUS ELECTROLYTE BATTERY AND NEGATIVE ELECTRODE

CROSS REFERENCES TO RELATED APPLICATIONS

The present application claims priority to Japanese Patent Application JP 2008-044685 filed in the Japanese Patent Office on Feb. 26, 2008, the entire contents of which being incorporated herein by reference.

BACKGROUND

The present application relates to a non-aqueous electrolyte secondary battery containing polyvinylidene fluoride and polyacrylonitrile as a binder of a negative electrode and a negative electrode.

In recent years, a number of portable electronic devices, for example, camcorders (video tape recorders), digital still cameras, cellular phones, personal digital assistants and laptop computers, each achieving a reduction in size and weight, have appeared. With respect to batteries, in particular, secondary batteries as a portable power source for such electronic devices, intensive studies have been conducted for the purpose of enhancing the energy density.

Above all, lithium ion secondary batteries using carbon for a negative electrode active material, a lithium-transition metal composite oxide for a positive electrode active material and a carbonic ester mixture for an electrolytic solution have been widely put to practical use because they are able to obtain a high energy density as compared with lead batteries and nickel-cadmium batteries which are related-art aqueous electrolytic solution secondary batteries (see, for example, JP-A-4-332479).

Here, it is proposed to use polyacrylonitrile as a binder of a negative electrode (see, for example, JP-A-2005-327630).

SUMMARY

However, when polyacrylonitrile is used as a binder of a negative electrode as disclosed in the above-cited JP-A-2005-327630, in the case where it is attempted to achieve thick coating (increase of surface density) of an electrode for the purpose of increasing the capacity of a battery, there are generated such problems that the drying time after coating of the electrode becomes long due to a low solids content, whereby the productivity falls down; and that when the amount of polyacrylonitrile is high, the degree of hardening of an electrode increases, whereby electrode cracking is easily caused. Thus, improvements are required.

In view of the foregoing problems, it is desirable to provide a non-aqueous electrolyte secondary battery capable of preventing electrode cracking from occurring while enhancing the productivity of an electrode, especially a negative electrode and a negative electrode.

The present application has been based on the discovery that a non-aqueous electrolyte secondary battery can be made advantageously by containing polyvinylidene fluoride and polyacrylonitrile in a specified mass ratio as a binder of a negative electrode.

According to an embodiment, a non-aqueous electrolyte secondary battery and a negative electrode as described below are provided.

A non-aqueous electrolyte secondary battery including a positive electrode, a negative electrode and a non-aqueous electrolyte, wherein the negative electrode contains a negative electrode mixture containing a binder; and the binder contains polyvinylidene fluoride and polyacrylonitrile, with a mass ratio of polyvinylidene fluoride to polyacrylonitrile being from 99.9/0.1 to 95.1/4.9 according to an embodiment.

A negative electrode containing a negative electrode mixture containing a binder, wherein the binder contains polyvinylidene fluoride and polyacrylonitrile, with a mass ratio of polyvinylidene fluoride to polyacrylonitrile being from 99.9/0.1 to 95.1/4.9 according to an embodiment.

According to an embodiment, it is possible to increase a solid content of the negative electrode. According to an embodiment, it is possible to expect to achieve enhancements in the productivity such that the negative electrode mixture can be uniformly mixed and that a drying time can be shortened. Also, according to an embodiment, even when the solid content increases, electrode cracking can be prevented from occurring. This may be due to the fact that by blending a specified amount of polyacrylonitrile in the negative electrode mixture, an appropriate viscosity can be kept.

Additional features and advantages are described herein, and will be apparent from the following Detailed Description and the figures.

DETAILED DESCRIPTION

A non-aqueous electrolyte secondary battery according to an embodiment is hereunder described in detail with reference to the accompanying drawings.

Figure 1:
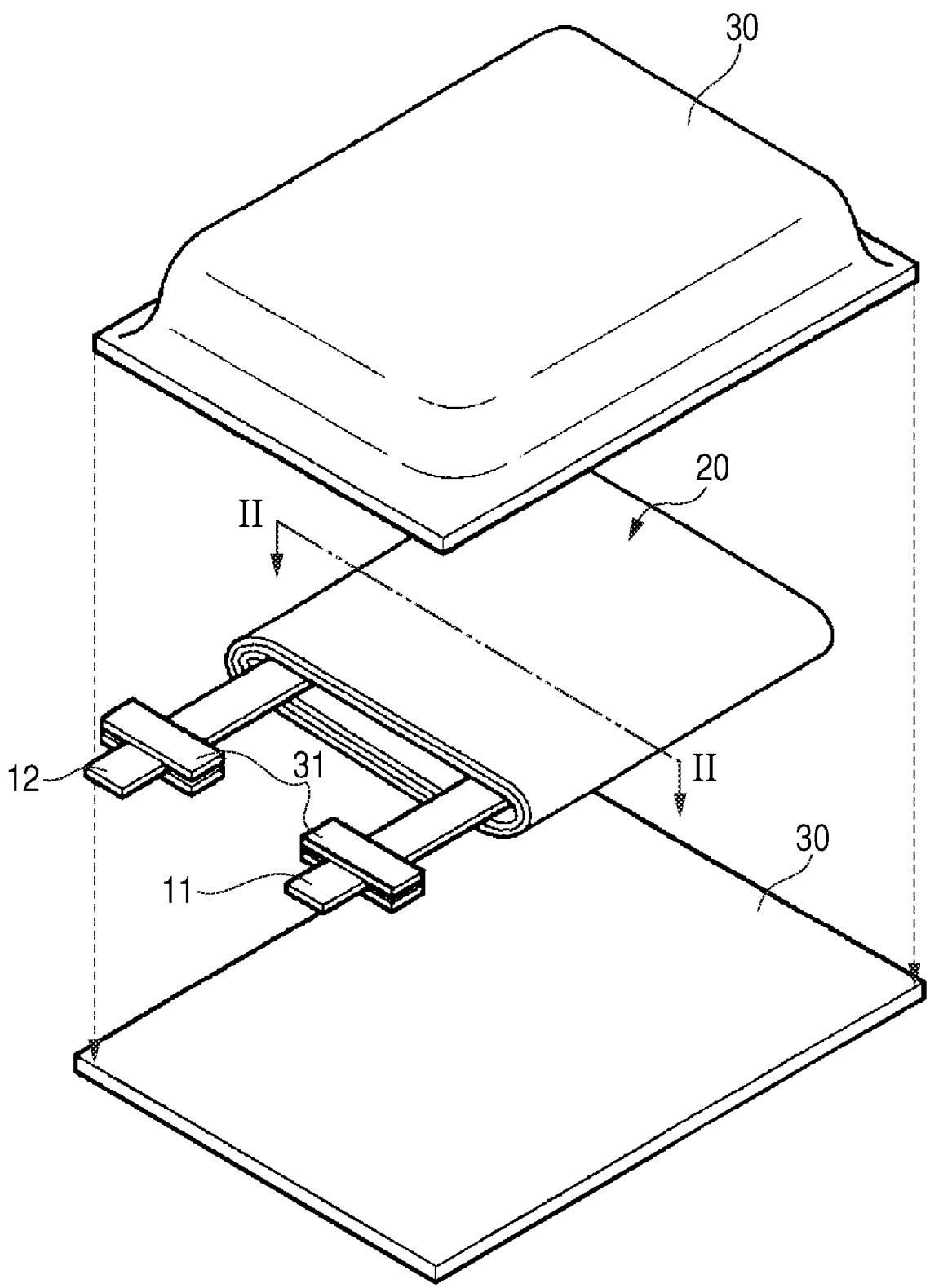
FIG. 1 is an exploded perspective view showing one example of a laminate type battery which is a non-aqueous electrolyte secondary battery according to an embodiment.

FIG. 1 is an exploded perspective view showing one example of a laminate type secondary battery which is a non-aqueous electrolyte secondary battery according to an embodiment. As shown in FIG. 1, this secondary battery is configured in such a manner that a battery element 20 having a negative electrode terminal 11 and a positive electrode terminal 12 installed therein is charged in the inside of an exterior member 30 in a film state. The negative electrode terminal 11 and the positive electrode terminal 12 are each derived in, for example, the same direction from the inside towards the outside of the exterior member 30. The negative electrode terminal 11 and the positive electrode terminal 12 are each constituted of a metal material, for example, aluminum (Al), copper (Cu), nickel (Ni) and stainless steel (SUS).

The exterior member 30 is constituted of a rectangular laminated film obtained by sticking, for example, a nylon film, an aluminum foil and a polyethylene film in this order. The exterior member 30 is, for example, provided in such a manner that the polyethylene film side and the battery element 20 are disposed opposing to each other, and respective external edges thereof are joined with each other by fusion or an adhesive. An adhesive film 31 is inserted between the exterior member 30 and each of the negative electrode terminal 11 and the positive electrode terminal 12 for the purpose of preventing invasion of the outside air from occurring. The adhesive film 31 is constituted of a material having adhesiveness to the negative electrode terminal 11 and the positive electrode terminal 12, and for example, in the case where the negative electrode terminal 11 and the positive electrode terminal 12 are each constituted of the foregoing metal material, it is preferable that the adhesive film 31 is constituted of a polyolefin resin, for example, polyethylene, polypropylene, modified polyethylene and modified polypropylene.

The exterior member 30 may also be constituted of a laminated film having other structure, for example, a metal material-free laminated film, a polymer film, for example, polypropylene, a metal film or the like in place of the foregoing laminated film. Here, a general configuration of the exterior member can be expressed by a laminate structure of exterior layer/metal foil/sealant layer (however, the exterior layer and the sealant layer are sometimes configured of plural layers). In the foregoing example, the nylon film is corresponding to the exterior layer, the aluminum foil is corresponding to the metal foil, and the polyethylene film is corresponding to the sealant layer. It is sufficient that the metal foil functions as a barrier membrane having water vapor permeation resistance. As the metal foil, not only the aluminum foil but a stainless steel foil, a nickel foil and a plated iron foil are useful. Of these, the aluminum foil which is thin, lightweight and excellent in workability can be favorably used.

Examples of a mode of the configuration (exterior layer/metal foil/sealant layer) which can be used as the exterior member include Ny (nylon)/Al (aluminum)/CPP (cast polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (linear low density polyethylene), PET/PE/Al/PET/LDPE (low density polyethylene), PET/Ny/Al/LDPE/CPP and the like.

Figure 2:
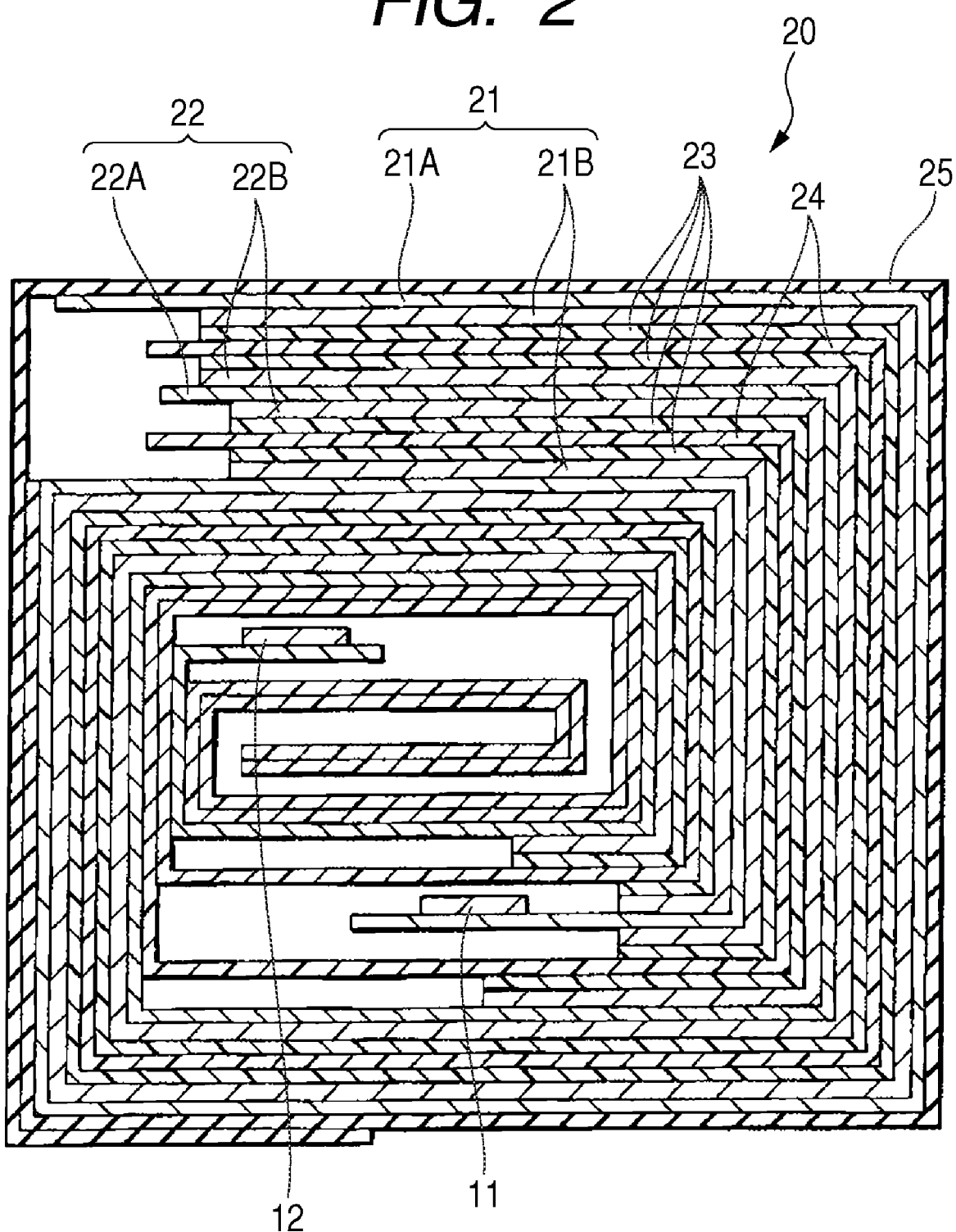
FIG. 2 is a schematic cross-sectional view of the battery element as shown in FIG. 1 along an II-II line thereof.

FIG. 2 is a schematic cross-sectional view showing the battery element 20 as shown in FIG. 1 along an II-II line thereof. In FIG. 2, the battery element 20 is one in which a negative electrode 21 and a positive electrode 22 are disposed opposing to each other and wound via a gel non-aqueous electrolyte layer 23 composed of a gel non-aqueous electrolyte and a separator 24, and an outermost periphery thereof is protected by a protective tape 25.

[Negative Electrode]

Here, the negative electrode 21 has, for example, a structure in which a negative electrode mixture layer 21B is provided on one or both surfaces of a negative electrode collector 21A having a pair of opposing surfaces. The negative electrode collector 21A has a portion which is exposed without being provided with the negative electrode mixture layer 21B in one end in the longitudinal direction thereof, and the negative electrode terminal 11 is installed in this exposed portion. The negative electrode collector 21A is constituted of a metal foil, for example, a copper foil, a nickel foil and a stainless steel foil.

The negative electrode mixture layer 21B contains, as a negative electrode active material, any one kind or two or more kinds of a negative electrode material capable of intercalating and deintercalating a lithium ion and metallic lithium and contains, as a binder, polyvinylidene fluoride and polyacrylonitrile. The negative electrode mixture layer 21B may contain a conductive agent as the need arises. Also, a surface density of the negative electrode mixture layer 21B is preferably 5 mg/cm2 or more, and more preferably 10 mg/cm2 or more per both surfaces. When the surface density falls within this range, an effect for improving characteristics due to an increase of the solid content according to an embodiment is easily obtainable.

Examples of the negative electrode material capable of intercalating and deintercalating lithium include carbon materials, for example, hardly graphitized carbon, easily graphitized carbon, natural graphite, artificial graphite, pyrolytic carbons, cokes, vitreous carbons, organic polymer compound burned materials, carbon fibers and active carbon. Of these, examples of the cokes include pitch coke, needle coke and petroleum coke. The organic polymer compound burned material as referred to herein is a material obtained through carbonization by burning a polymer material, for example, phenol resins and furan resins at an appropriate temperature, and a part thereof is classified into hardly graphitized carbon or easily graphitized carbon. Also, examples of the polymer material include polyacetylene and polypyrrole. Such a carbon material is preferable because a change in the crystal structure to be generated at the time of charge and discharge is very small, a high charge-discharge capacity can be obtained, and a good cycle characteristic can be obtained. In particular, graphite is preferable because its electrochemical equivalent is large, and a high energy density can be obtained.

Also, hardly graphitized carbon is preferable because excellent characteristics are obtainable. Moreover, a material having a low charge-discharge potential, specifically one having a charge-discharge potential close to a lithium metal, is preferable because it is easy to realize a high energy density of the battery.

Examples of the negative electrode material capable of intercalating and deintercalating lithium further include a material capable of intercalating and deintercalating lithium and containing, as a constitutional element, at least one of metal elements and semi-metal elements. This is because by using such a material, a high energy density can be obtained. In particular, the joint use of such a material with the carbon material is more preferable because not only a high energy density can be obtained, but an excellent cycle characteristic can be obtained.

This negative electrode material may be a single body, an alloy or a compound of a metal element or a semi-metal element. Also, the negative electrode material may have one or two or more kinds of such a phase in at least a part thereof. In an embodiment, the alloy includes alloys containing at least one metal element and at least one semi-metal element in addition to alloys composed of two or more metal elements. Also, the negative electrode material may contain a non-metal element. Examples of its texture include a solid solution, a eutectic (eutectic mixture), an intermetallic compound and one in which two or more thereof coexist.

Examples of the metal element or semi-metal element which constitutes this negative electrode material include magnesium (Mg), boron (B), aluminum (Al), gallium (Ga), indium (In), silicon (Si), germanium (Ge), tin (Sn), lead (Pb), bismuth (Bi), cadmium (Cd), silver (Ag), zinc (Zn), hafnium (Hf), zirconium (Zr), yttrium (Y), palladium (Pd) and platinum (Pt). These may be crystalline or amorphous.

Of these, ones containing, as a constitutional element, a metal element or a semi-metal element belonging to the Group 4B in the short form of the periodic table are preferable, and ones containing, as a constitutional element, at least one of silicon (Si) and tin (Sn) are especially preferable as the negative electrode material. This is because silicon (Si) and tin (Sn) have large ability for intercalating and deintercalating lithium (Li), and a high energy density can be obtained.

Examples of alloys of tin (Sn) include alloys containing, as a second constitutional element other than tin (Sn), at least one member selected from the group consisting of silicon (Si), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr). Examples of alloys of silicon (Si) include alloys containing, as a second constitutional element other than silicon (Si), at least one member selected from the group consisting of tin (Sn), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb) and chromium (Cr).

Examples of compounds of tin (Sn) or silicon (Si) include compounds containing oxygen (O) or carbon (C), and these compounds may contain the foregoing second constitutional element in addition to tin (Sn) or silicon (Si).

Examples of the negative electrode material capable of intercalating and deintercalating lithium further include other metal compounds and polymer materials. Examples of other metal compounds include oxides (for example, $MnO_2$, $V_2O_5$ and $V_6O_{13}$), sulfides (for example, NiS and MoS) and lithium nitrides (for example, $LiN_3$); and examples of polymer materials include polyacetylene, polyaniline and polypyrrole.

Also, as a material capable of alloying lithium, various kinds of metals or the like can be used. Tin (Sn), cobalt (Co), indium (In), aluminum (Al), silicon (Si) and alloys thereof are frequently used. In case of using metallic lithium, a powder may be formed into a coating film by using a binder.

Also, the binder of the negative electrode in an embodiment contains polyvinylidene fluoride and polyacrylonitrile. Furthermore, a mass ratio of polyvinylidene fluoride to polyacrylonitrile is from 99.9/0.1 to 95.1/4.9, and preferably from 99/1 to 95.1/4.9. When the polyacrylonitrile is added in an amount of 5% by mass or more, the electrode becomes hard, thereby causing a problem of electrode cracking. As the polyvinylidene fluoride, for example, it is preferable to use one having an intrinsic viscosity of from 1.5 to 10.0 dL/g or the like. However, it should not be construed that the present application is limited thereto. Also, as the polyacrylonitrile, for example, polyacrylonitrile having a functional group (for example, an alcoholic hydroxyl group, a carboxyl group and a nitrile group) in a molecule thereof is preferable. However, it should not be construed that the present application is limited thereto.

A total content of the foregoing polyvinylidene fluoride and polyacrylonitrile is preferably from 2 to 6.5% by mass, and more preferably from 2.5 to 5% by mass on the basis of the total content of the negative electrode mixture. When the total content of polyvinylidene fluoride and polyacrylonitrile falls within the foregoing range, a more favorable cycle characteristic is obtainable.

A carbon material, for example, carbon black and graphite, or the like is used as a conductive agent.

[Positive Electrode]

On the other hand, likewise the negative electrode 21, the positive electrode 22 has, for example, a structure in which a positive electrode mixture layer 22B is coated on one or both surfaces of a positive electrode collector 22A having a pair of opposing surfaces. The positive electrode collector 22A has a portion in which the positive electrode mixture layer 22B is exposed without being coated in one end in the longitudinal direction thereof, and the positive electrode terminal 12 is installed in this exposed portion. The positive electrode collector 22A is constituted of a metal foil, for example, an aluminum foil.

The positive electrode mixture layer 22B contains, as a positive electrode active material, a positive electrode material capable of intercalating and deintercalating a lithium ion. The positive electrode mixture layer 22B may contain a conductive agent and a binder as the need arises. Here, the positive electrode active material, the conductive agent and the binder may be uniformly dispersed, and a mixing ratio thereof does not matter.

The positive electrode material capable of intercalating and deintercalating lithium to be used as the positive electrode active material is chosen according to the kind of a desired battery, and suitable examples thereof include lithium-containing compounds, for example, lithium oxide, lithium phosphorus oxide, lithium sulfide and lithium-containing intercalation compounds. A mixture of two or more kinds thereof may be used. In order to increase the energy density, a lithium-containing compound containing lithium, a transition metal element and oxygen (O) is preferable. Of these, one containing, as the transition metal element, at least one member selected from the group consisting of cobalt (Co), nickel (Ni), manganese (Mn) and iron (Fe) is more preferable. Examples of such a lithium-containing compound include lithium composite oxides having a layered rock salt type structure as shown in the following formula (1); lithium composite oxides having a spinel type structure as shown in the following formula (2); and lithium composite phosphates having an olivine type structure as shown in the following formula (5). Specific examples thereof include $LiCoO_2$, $LiNiO_2$, $LiMn_2O_4$, $LiCo_{0.33}Ni_{0.33}Mn_{0.33}O_2$ and $LiFePO_4$.

Layered Rock Salt Type $$Li_pMn_{(1-p-q-r)}Ni_qM1_rO_{(2-y1)}F_{z1} \qquad (1\text{-}1)$$

In the formula (1-1), M1 represents at least one member selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and p, q, r, y1 and z1 are each a value satisfied with $0 < p \leq 0.2$, $0.1 \leq q \leq 0.8$, $0 \leq r \leq 0.5$, $-0.1 \leq y \leq 0.2$ and $0 \leq z1 \leq 0.1$.

Layered Rock Salt Type $$Li_pMn_{(1-p-q-r)}Co_qM1_rO_{(2-y1)}F_{z1} \qquad (1\text{-}2)$$

In the formula (1-2), M1 represents at least one member selected from the group consisting of nickel (Ni), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and p, q, r, y1 and z1 are each a value satisfied with $0 < p \leq 0.2$, $0.1 \leq q \leq 0.8$, $0 \leq r \leq 0.5$, $-0.1 \leq y \leq 0.2$ and $0 \leq z1 \leq 0.1$.

Layered Rock Salt Type $$Li_pNi_{(1-p-q-r)}Mn_qM1_rO_{(2-y1)}F_{z1} \qquad (1\text{-}3)$$

In the formula (1-3), M1 represents at least one member selected from the group consisting of cobalt (Co), magnesium (Mg), aluminum (Al), boron (B), titanium (Ti), vanadium (V), chromium (Cr), iron (Fe), copper (Cu), zinc (Zn), zirconium (Zr), molybdenum (Mo), tin (Sn), calcium (Ca), strontium (Sr) and tungsten (W); and p, q, r, y1 and z1 are each a value satisfied with $0 < p \leq 0.2$, $0.1 \leq q \leq 0.8$, $0 \leq r \leq 0.5$, $-0.1 \leq y \leq 0.2$ and $0 \leq z1 \leq 0.1$.

Spinel Type $$Li_aMn_{2-b}M4_bO_cF_d \qquad (2)$$

In the formula (2), M4 represents at least one member selected from the group consisting of cobalt, nickel, magnesium, aluminum, boron, titanium, vanadium, chromium, iron, copper, zinc, molybdenum, tin, calcium, strontium and tungsten; and a, b, c and d are each a value satisfied with a $\geq 0.9$, $0 \leq b \leq 0.6$, $3.7 \leq c \leq 4.1$ and $0 \leq d \leq 0.1$.

Olivine Type $$LiM5PO_4 \qquad (5)$$

In the formula (5), M5 represents at least one member selected from the group consisting of cobalt, manganese, iron, nickel, magnesium, aluminum, boron, titanium, vanadium, niobium, copper, zinc, molybdenum, calcium, strontium, tungsten and zirconium; and a is a value satisfied with a $\geq 0.9$.

In addition to the foregoing compounds, examples of the positive electrode material capable of intercalating and deintercalating lithium include lithium-free inorganic compounds, for example, $MnO_2$, $V_2O_5$, $V_6O_{13}$, NiS and MoS.

Also, examples of the conductive agent include carbon materials, for example, carbon black and graphite and the like. Furthermore, examples of the binder include polyvinylidene fluoride, polytetrafluoroethylene and polyvinylidene trifluoride.

[Non-Aqueous Electrolyte Layer]

The non-aqueous electrolyte layer 23 is, for example, formed of a gel non-aqueous electrolyte. The gel non-aqueous electrolyte is one prepared by gelation of a non-aqueous electrolytic solution with a matrix polymer. In the gel non-aqueous electrolyte, the non-aqueous electrolytic solution is impregnated with or supported by the matrix polymer. By swelling or gelation or non-fluidization of such a matrix polymer, it is possible to effectively suppress the occurrence of liquid leakage of the non-aqueous electrolyte in the obtained battery. As the non-aqueous electrolytic solution, ones which are generally used in lithium ion secondary batteries are useful. As such a non-aqueous electrolytic solution, ones obtained by dissolving an electrolyte salt in a non-aqueous solvent are useful.

Specific examples of the non-aqueous solvent which can be used include cyclic carbonic esters such as ethylene carbonate and propylene carbonate. It is preferable to use either one of ethylene carbonate and propylene carbonate, and it is especially preferable to use a mixture of ethylene carbonate and propylene carbonate. This is because the cycle characteristic can be enhanced.

In addition to the foregoing cyclic carbonic ester, it is preferable to use a mixture thereof with a chain carbonic ester such as diethyl carbonate, dimethyl carbonate, ethylmethyl carbonate and methylisopropyl carbonate as the non-aqueous solvent. This is because high ionic conductivity can be obtained.

Moreover, it is preferable that the non-aqueous solvent further contains 2,4-difluoroanisole or vinylene carbonate. This is because 2,4-difluoroanisole is able to enhance the discharge capacity; and vinylene carbonate is able to enhance the cycle characteristic. Accordingly, the use of a mixture of these compounds is preferable because the discharge capacity and the cycle characteristic can be enhanced.

Besides, examples of the non-aqueous solvent include butylene carbonate, γ-butyrolactone, γ-valerolactone, 1,2-dimethoxyethane, tetrahydrofuran, 2-methyltetrahydrofuran, 1,3-dioxolan, 4-methyl-1,3-dioxolan, methyl acetate, methyl propionate, acetonitrile, glutaronitrile, adiponitrile, methoxyacetonitrile, 3-methoxypropyronitrile, N,N-dimethylformamide, N-methylpyrrolidinone, N-methyloxazolidinone, N,N-dimethylimidazolidinone, nitromethane, nitroethane, sulfolane, dimethyl sulfoxide and trimethyl phosphate.

A compound obtained by substituting at least a part of hydrogen of such a non-aqueous solvent with a halogen, for example, fluorine may be sometimes preferable because reversibility of the electrode reaction can be enhanced depending upon the kind of an electrode to be combined.

Examples of the electrolyte salt include lithium salts, and these lithium salts may be used singly or in admixture of two or more kinds thereof. Examples of the lithium salts include $LiPF_6$, $LiBF_4$, $LiAsF_6$, $LiClO_3$, $LiClO_4$, $LiNO_3$, $LiB(C_6H_5)_4$, $LiCH_3SO_3$, $LiCF_3SO_3$, $LiN(CF_3SO_2)_2$, $LiN(C_2F_5SO_2)_2$, $LiC(SO_2CF_3)_3$, $LiAlCl_4$, $LiSiF_6$, lithium difluoro[oxolato-O,O']borate, lithium bisoxolatoborate, LiBr, LiCl and LiI. A concentration at which the lithium salt is dissolved is preferably in the range of 0.4 moles/kg or more and not more than 2.0 moles/kg relative to the foregoing non-aqueous solvent. From the viewpoint of oxidation stability, it is desirable to use $LiPF_6$ or $LiBF_4$. Above all, $LiPF_6$ is preferable because not only high ionic conductivity can be obtained, but the cycle characteristic can be enhanced.

The gel non-aqueous electrolyte is generated upon gelation of the foregoing non-aqueous electrolytic solution with a matrix polymer. The matrix polymer may be one which is compatible with the non-aqueous electrolytic solution having the foregoing electrolyte salt dissolved in the foregoing non-aqueous solvent and can be gelated. Examples of such a matrix polymer include fluorocarbon based polymer compounds, for example, polyvinylidene fluoride and copolymers with vinylidene fluoride; ether based polymer compounds, for example, polyethylene oxide and polyethylene oxide-containing crosslinked materials; and polymers containing, as a repeating unit, polypropylene oxide, polyacrylonitrile, polymethacrylonitrile or the like. Specific examples thereof include a copolymer of vinylidene fluoride and hexafluoropropylene, a copolymer of vinylidene fluoride, hexafluoropropylene and monochlorotrifluoroethylene and a copolymer of vinylidene fluoride, hexafluoropropylene and monomethyl maleate. Of these, from the viewpoint of softness of the gel, a copolymer of vinylidene fluoride and hexafluoropropylene is preferable. These polymers may be used singly or in admixture of two or more kinds thereof.

Of these, from the viewpoint of oxidation-reduction stability, fluorocarbon based polymer compounds are especially desirable. For example, polyvinylidene fluoride and a copolymer in which hexafluoropropylene is introduced in a proportion of not more than 75% into vinylidene fluoride can be used. Such a polymer has a number average molecular weight in the range of from $5.0 \times 10^5$ to $7.0 \times 10^5$ (from 500,000 to 700,000) or a weight average molecular weight in the range of from $2.1 \times 10^5$ to $3.1 \times 10^5$ (from 210,000 to 310,000) and has an intrinsic viscosity in the range of from 1.7 (dL/g) to 2.1 (dL/g).

[Separator]

Also, the separator 24 is constituted of an insulating thin membrane having large ion permeability and prescribed mechanical strength, for example, a porous membrane made of a polyolefin based organic resin, for example, polypropylene and polyethylene, or a porous membrane made of an inorganic material, for example, a ceramic-made non-woven fabric and may also have a structure in which two or more kinds of such a porous membrane are laminated. In particular, one containing a polyolefin based porous membrane is favorable because it is excellent in separation properties between the negative electrode 21 and the positive electrode 22, and an internal short circuit and a lowering in an open circuit voltage can be much more reduced.

Next, one example of the manufacturing method of the foregoing non-aqueous electrolyte secondary battery is described.

The foregoing laminate type secondary battery can be manufactured in the following manner. First of all, the negative electrode 21 is prepared. For example, in case of using a granular negative electrode active material, a negative electrode active material and the foregoing binder and optionally, a conductive agent are mixed to prepare a negative electrode mixture, which is then dispersed in a dispersant, for example, N-methyl-2-pyrrolidone to prepare a negative electrode mixture slurry. Next, this negative electrode mixture slurry is coated on the negative electrode collector 21A and dried, and then compression molded to form the negative electrode mixture layer 21B.

Also, the positive electrode 22 is prepared. For example, in case of using a granular positive electrode active material, a positive electrode active material and optionally, a conductive agent and a binder are mixed to prepare a positive electrode mixture, which is then dispersed in a dispersant such as N-methyl-2-pyrrolidone to prepare a positive electrode mixture slurry. Thereafter, this positive electrode mixture slurry is coated on the positive electrode collector 22A and dried, and then compression molded to form the positive electrode mixture layer 22B.

Next, the negative electrode terminal 11 is installed in the negative electrode 21, and the positive electrode terminal 12 is also installed in the positive electrode 22. At that time, the protective tape 25 may be stuck on a welded part of the negative electrode terminal 11 or the positive electrode terminal 12 and its back surface, or on the collector of an interface portion between the mixture-coated portion and the collector-exposed portion.

Next, the non-aqueous electrolyte layer 23 is formed on one or both surfaces of the thus obtained negative electrode 21. For example, an electrolyte salt (for example, lithium hexafluorophosphate), a non-aqueous solvent (for example, ethylene carbonate and propylene carbonate) and a matrix polymer (for example, polyvinylidene fluoride) are mixed and dissolved together with a diluting solvent (for example, dimethyl carbonate (DMC)) to prepare a sol non-aqueous electrolyte. This sol non-aqueous electrolyte is coated on the negative electrode 21, and the diluting solvent is volatilized to form the non-aqueous electrolyte layer 23 composed of a gel non-aqueous electrolyte.

Furthermore, the non-aqueous electrolyte layer 23 is formed on one or both surfaces of the thus obtained positive electrode 22. For example, an electrolyte salt (for example, lithium hexafluorophosphate), a non-aqueous solvent (for example, ethylene carbonate and propylene carbonate) and a matrix polymer (for example, polyvinylidene fluoride) are mixed and dissolved together with a diluting solvent (for example, dimethyl carbonate (DMC)) to prepare a sol non-aqueous electrolyte. This sol non-aqueous electrolyte is coated on the positive electrode 22, and the diluting solvent is volatilized to form the non-aqueous electrolyte layer 23 composed of a gel non-aqueous electrolyte.

Thereafter, the separator 24, the positive electrode 22 having the non-aqueous electrolyte layer 23 formed thereon, the separator 24 and the negative electrode 21 having the non-aqueous electrolyte layer 23 formed thereon are successively laminated and wound, and the protective tape 25 is bonded to the outermost periphery to form the battery element 20. Furthermore, this battery element 20 is packed by the exterior member 30. There is thus completed the laminate type secondary battery as shown in FIGS. 1 and 2.

This non-aqueous electrolyte secondary battery may also be manufactured in the following manner. For example, the completed battery element is not packed by an exterior member, but the non-aqueous electrolyte layer 23 may be formed by coating a monomer or polymer of a matrix polymer on the negative electrode 21 and the positive electrode 22 or the separator 24 and winding to prepare a wound electrode body, containing the wound electrode body in the inside of the exterior member 30 and then pouring the foregoing non-aqueous electrolyte solution thereinto. However, what the monomer is polymerized in the inside of the exterior member 30 is preferable because joining properties between the non-aqueous electrolyte layer 23 and the separator 24 are enhanced, whereby the internal resistance can be reduced. Also, what the non-aqueous electrolytic solution is poured into the inside of the exterior member 30 to form a gel non-aqueous electrolyte is preferable because it can be simply manufactured in a small number of processes.

In the above-described secondary battery, when charge is carried out, a lithium ion is deintercalated from the positive electrode mixture layer 22B and intercalated in the negative electrode mixture layer 21B via the non-aqueous electrolyte layer 23. When discharge is carried out, a lithium ion is deintercalated from the negative electrode mixture layer 21B and intercalated in the positive electrode mixture layer 22B via the non-aqueous electrolyte layer 23.

EXAMPLES

An embodiment is described below in more detail with reference to the following Examples and Comparative Examples. Concretely, the laminate type secondary battery as shown in FIGS. 1 and 2 was prepared by carrying out the operations described in each of these Examples and Comparative Examples, and performances thereof were evaluated.

Example 1-1

Preparation of Negative Electrode

First of all, 99% by mass of artificial graphite as a negative electrode active material and 0.999% by mass of polyvinylidene fluoride (PVdF) and 0.001% by mass of polyacrylonitrile (PAN) as a binder were uniformly mixed, and N-methyl-2-pyrrolidone (NMP) was added to obtain a negative electrode mixture slurry. Subsequently, the obtained negative electrode mixture slurry was uniformly coated on both surfaces of a negative electrode collector made of a copper foil having a thickness of 15 µm, dried and then compression molded by a roll press to form a negative electrode mixture layer (surface density per both surfaces: 20 mg/cm$^2$, binder content: 1% by mass). The thus formed negative electrode mixture layer was cut out in a width of 52 mm to prepare a negative electrode. Thereafter, a negative electrode terminal made of nickel was installed in the negative electrode.

<Preparation of Positive Electrode>

Next, 96% by mass of lithium cobaltate (LiCoO2) as a positive electrode active material, 1% by mass of ketjen black as a conductive agent and 3% by mass of polyvinylidene fluoride as a binder were uniformly mixed, and NMP was added to obtain a positive electrode mixture slurry. Subsequently, the obtained positive electrode mixture slurry was uniformly coated on both surfaces of a positive electrode collector made of an aluminum foil having a thickness of 15 µm, dried and then compression molded by a roll press to form a positive electrode mixture layer (surface density per both surfaces: 40 mg/cm2). The thus formed positive electrode mixture layer was cut out in a width of 50 mm to prepare a positive electrode. Thereafter, a positive electrode terminal made of aluminum was installed in the positive electrode.

<Preparation of Non-Aqueous Electrolyte>

1 mole/kg of lithium hexafluorophosphate (LiPF6) as an electrolyte salt was dissolved in a non-aqueous solvent obtained by mixing ethylene carbonate (EC) and propylene carbonate (PC) in a proportion of 1/1 (mass ratio) to prepare an electrolytic solution. Polyvinylidene fluoride was used as a matrix polymer for forming a gel and mixed in the electrolytic solution in a proportion of the matrix polymer to the electrolytic solution of ⅛ (mass ratio), and a sol non-aqueous electrolyte was prepared by using dimethyl carbonate as a solvent. The obtained sol non-aqueous electrolyte was uniformly coated on both surfaces of each of the obtained negative electrode and positive electrode, and the solvent was volatilized to form a gel non-aqueous electrolyte layer on each of the negative electrode and the positive electrode.

<Preparation of Battery>

The negative electrode and the positive electrode each having this gel non-aqueous electrolyte layer formed thereon were laminated via a separator made of porous polyethylene having a thickness of 9 μm and wound to prepare a battery element, which was then packed by an aluminum laminate film as an exterior member to obtain a non-aqueous electrolyte secondary battery. The obtained secondary battery was evaluated in the following manners. The obtained results are shown in Table 1.

<Evaluation of Battery>

Evaluation of Solid Content of Negative Electrode Mixture Slurry

A mass proportion of the solid content in the total mass of the negative electrode mixture slurry when a viscosity of the negative electrode mixture slurry reached 10 mPaS was calculated. The solid content as referred to herein is one obtained by subtracting NMP as the solvent from the negative electrode mixture slurry.

Evaluation of Electrode Cracking

An electrode of 100 mm in length and 40 mm in width was rounded in a U-shaped form, and a trough thereof was pressed by a round rod of ϕ10 mm. At that time, the electrode cracking was determined on whether or not the active material was cracked.

Evaluation of Cycle Characteristic

A charge-discharge cycle was carried out under the following conditions, and a ratio (%) of a discharge capacity after 200 cycles to an initial discharge capacity was defined as an index for the evaluation.

Charge Method

The charge was carried out at a current value of 1 C (corresponding to the cell capacity) in a CC-CV mode for 3 hours until a battery voltage reached 4.2 V.

Discharge Method

The discharge was carried out at a constant current value of 1 C (corresponding to the cell capacity) until a battery voltage reached 3 V.

Examples 1-2 to 1-4 and Comparative Examples 1-1 to 1-6

Each of secondary batteries was obtained in the same manner as in Example 1-1, except for changing the blending proportion of PVdF and PAN in the binder of the negative electrode as shown in Table 1. The evaluation results are shown in Table 1.

TABLE 1

| | Binder (1% by mass) | | | Surface density per both surfaces of negative electrode (mg/cm$^2$) | Negative electrode active material | Solid content of negative electrode mixture slurry (%) | Electrode cracking | Capacity retention rate after 200 cycles (%) |
|---|---|---|---|---|---|---|---|---|
| | PVdF/PAN | PVdF (% by mass) | PAN (% by mass) | | | | | |
| Example 1-1 | 99.9/0.1 | 0.999 | 0.001 | 20 | Artificial graphite | 70 | No | 70 |
| Example 1-2 | 99/1 | 0.99 | 0.01 | 20 | Artificial graphite | 71 | No | 70 |
| Example 1-3 | 96/4 | 0.96 | 0.04 | 20 | Artificial graphite | 72 | No | 70 |
| Example 1-4 | 95.1/4.9 | 0.951 | 0.049 | 20 | Artificial graphite | 71 | No | 69 |
| Comparative Example 1-1 | 100/0 | 1 | 0 | 20 | Artificial graphite | 51 | No | 67 |
| Comparative Example 1-2 | 95/5 | 0.95 | 0.05 | 20 | Artificial graphite | 63 | Yes | 70 |
| Comparative Example 1-3 | 80/20 | 0.8 | 0.2 | 20 | Artificial graphite | 61 | Yes | 70 |
| Comparative Example 1-4 | 50/50 | 0.5 | 0.5 | 20 | Artificial graphite | 61 | Yes | 70 |
| Comparative Example 1-5 | 20/80 | 0.2 | 0.8 | 20 | Artificial graphite | 61 | Yes | 70 |
| Comparative Example 1-6 | 0/100 | 0 | 1 | 20 | Artificial graphite | 61 | Yes | 55 |

As is clear from the results of Table 1, in the secondary batteries of Examples 1-1 to 1-4 each containing polyacrylonitrile in a mass ratio of not more than 4.9 in the binder of the negative electrode, the solid content was high, and the electrode cracking could be prevented from occurring. On the other hand, in Comparative Example 1-1 not containing polyacrylonitrile at all, though the electrode cracking was not generated, the results revealed that the solid content was markedly low. Also, in Comparative Examples 1-2 to 1-6 each containing polyacrylonitrile in a mass ratio of 5 or more, the solid content was low, and the electrode cracking was generated. In Examples 1-1 to 1-4, as to the reason why the solid content is high, it may be thought that when polyacrylonitrile is intermixed in a small amount relative to polyvinylidene fluoride in the binder of the negative electrode, even if a large amount of NMP as the solvent is not needed, a sufficient viscosity as the mixture can be secured due to an interaction between the molecules. As to the hardness of the electrode, it may be thought that the polyacrylonitrile itself is a hard binder, and therefore, if a large amount of polyacrylonitrile is used, the electrode hardness increases, thereby revealing such results.

Examples 2-1 to 2-4 and Comparative Examples 2-1 to 2-6

Non-aqueous electrolyte secondary batteries were each prepared in the same manner as in Example 1-1, etc., except for regulating the content of the binder of the negative electrode at 2% by mass. The evaluation results are shown in Table 2.

TABLE 2

| | Binder (2% by mass) | | Surface density per both surfaces of negative electrode (mg/cm$^2$) | Negative electrode active material | Solid content of negative electrode mixture slurry (%) | Electrode cracking | Capacity retention rate after 200 cycles (%) |
|---|---|---|---|---|---|---|---|
| | PVdF/PAN | PVdF (% by mass) | PAN (% by mass) | | | | |
| Example 2-1 | 99.9/0.1 | 1.998 | 0.002 | 20 | Artificial graphite | 69 | No | 96 |
| Example 2-2 | 99/1 | 1.98 | 0.02 | 20 | Artificial graphite | 70 | No | 95 |
| Example 2-3 | 96/4 | 1.92 | 0.08 | 20 | Artificial graphite | 71 | No | 95 |
| Example 2-4 | 95.1/4.9 | 1.902 | 0.098 | 20 | Artificial graphite | 70 | No | 95 |
| Comparative Example 2-1 | 100/0 | 2 | 0 | 20 | Artificial graphite | 50 | No | 90 |
| Comparative Example 2-2 | 95/5 | 1.9 | 0.1 | 20 | Artificial graphite | 62 | Yes | 96 |
| Comparative Example 2-3 | 80/20 | 1.6 | 0.4 | 20 | Artificial graphite | 60 | Yes | 96 |
| Comparative Example 2-4 | 50/50 | 1 | 1 | 20 | Artificial graphite | 60 | Yes | 96 |
| Comparative Example 2-5 | 20/80 | 0.4 | 1.6 | 20 | Artificial graphite | 60 | Yes | 96 |
| Comparative Example 2-6 | 0/100 | 0 | 2 | 20 | Artificial graphite | 60 | Yes | 72 |

As is clear from the results of Table 2, similar to the case of Examples 1-1 to 1-4, in the secondary batteries of Examples 2-1 to 2-4 each containing polyacrylonitrile in a mass ratio of not more than 4.9 in the binder of the negative electrode, the solid content was high, and the electrode cracking could be prevented from occurring. On the other hand, in Comparative Example 2-1 not containing polyacrylonitrile at all, though the electrode cracking was not generated, the results revealed that the solid content was markedly low. Also, in Comparative Examples 2-2 to 2-6 each containing polyacrylonitrile in a mass ratio of 5 or more, the solid content was low, and the electrode cracking was generated.

Examples 3-1 to 3-4 and Comparative Examples 3-1 to 3-6

Non-aqueous electrolyte secondary batteries were prepared in the same manner as in Example 1-1, etc., except for regulating the content of the binder of the negative electrode at 3.5% by mass. The evaluation results are shown in Table 3.

As is clear from the results of Table 3, similar to the case of Examples 1-1 to 1-4, in the secondary batteries of Examples 3-1 to 3-4 each containing polyacrylonitrile in a mass ratio of not more than 4.9 in the binder of the negative electrode, the solid content was high, and the electrode cracking could be prevented from occurring. On the other hand, in Comparative Example 3-1 not containing polyacrylonitrile at all, though the electrode cracking was not generated, the results revealed that the solid content was markedly low. Also, in Comparative Examples 3-2 to 3-6 each containing polyacrylonitrile in a mass ratio of 5 or more, the solid content was low, and the electrode cracking was generated.

Examples 4-1 to 4-4 and Comparative Examples 4-1 to 4-6

Non-aqueous electrolyte secondary batteries were each prepared in the same manner as in Example 1-1, etc., except for regulating the content of the binder of the negative electrode at 5% by mass. The evaluation results are shown in Table 4.

TABLE 3

| | Binder (3.5% by mass) | | Surface density per both surfaces of negative electrode (mg/cm$^2$) | Negative electrode active material | Solid content of negative electrode mixture slurry (%) | Electrode cracking | Capacity retention rate after 200 cycles (%) |
|---|---|---|---|---|---|---|---|
| | PVdF/PAN | PVdF (% by mass) | PAN (% by mass) | | | | |
| Example 3-1 | 99.9/0.1 | 3.4965 | 0.0035 | 20 | Artificial graphite | 69 | No | 96 |
| Example 3-2 | 99/1 | 3.465 | 0.035 | 20 | Artificial graphite | 70 | No | 95 |
| Example 3-3 | 96/4 | 3.36 | 0.14 | 20 | Artificial graphite | 71 | No | 95 |
| Example 3-4 | 95.1/4.9 | 3.3285 | 0.1715 | 20 | Artificial graphite | 70 | No | 95 |
| Comparative Example 3-1 | 100/0 | 3.5 | 0 | 20 | Artificial graphite | 50 | No | 90 |
| Comparative Example 3-2 | 95/5 | 3.325 | 0.175 | 20 | Artificial graphite | 62 | Yes | 96 |
| Comparative Example 3-3 | 80/20 | 2.8 | 0.7 | 20 | Artificial graphite | 60 | Yes | 96 |
| Comparative Example 3-4 | 50/50 | 1.75 | 1.75 | 20 | Artificial graphite | 60 | Yes | 96 |
| Comparative Example 3-5 | 20/80 | 0.7 | 2.8 | 20 | Artificial graphite | 60 | Yes | 96 |
| Comparative Example 3-6 | 0/100 | 0 | 3.5 | 20 | Artificial graphite | 60 | Yes | 72 |

TABLE 4

| | Binder (5% by mass) | | Surface density per both surfaces of negative electrode (mg/cm$^2$) | Negative electrode active material | Solid content of negative electrode mixture slurry (%) | Electrode cracking | Capacity retention rate after 200 cycles (%) |
| | PVdF/PAN | PVdF (% by mass) | PAN (% by mass) | | | | | |
|---|---|---|---|---|---|---|---|---|
| Example 4-1 | 99.9/0.1 | 4.995 | 0.005 | 20 | Artificial graphite | 68 | No | 96 |
| Example 4-2 | 99/1 | 4.95 | 0.05 | 20 | Artificial graphite | 69 | No | 95 |
| Example 4-3 | 96/4 | 4.8 | 0.2 | 20 | Artificial graphite | 70 | No | 95 |
| Example 4-4 | 95.1/4.9 | 4.755 | 0.245 | 20 | Artificial graphite | 69 | No | 95 |
| Comparative Example 4-1 | 100/0 | 5 | 0 | 20 | Artificial graphite | 49 | No | 90 |
| Comparative Example 4-2 | 95/5 | 4.75 | 0.25 | 20 | Artificial graphite | 61 | Yes | 96 |
| Comparative Example 4-3 | 80/20 | 4 | 1 | 20 | Artificial graphite | 59 | Yes | 96 |
| Comparative Example 4-4 | 50/50 | 2.5 | 2.5 | 20 | Artificial graphite | 59 | Yes | 96 |
| Comparative Example 4-5 | 20/80 | 1 | 4 | 20 | Artificial graphite | 59 | Yes | 96 |
| Comparative Example 4-6 | 0/100 | 0 | 5 | 20 | Artificial graphite | 59 | Yes | 72 |

As is clear from the results of Table 4, similar to the case of Examples 1-1 to 1-4, in the secondary batteries of Examples 4-1 to 4-4 each containing polyacrylonitrile in a mass ratio of not more than 4.9 in the binder of the negative electrode, the solid content was high, and the electrode cracking could be prevented from occurring. On the other hand, in Comparative Example 4-1 not containing polyacrylonitrile at all, though the electrode cracking was not generated, the results revealed that the solid content was markedly low. Also, in Comparative Examples 4-2 to 4-6 each containing polyacrylonitrile in a mass ratio of 5 or more, the solid content was low, and the electrode cracking was generated.

Examples 5-1 to 5-4 and Comparative Examples 5-1 to 5-6

Non-aqueous electrolyte secondary batteries were each prepared in the same manner as in Example 1-1, etc., except for regulating the content of the binder of the negative electrode at 6.5% by mass. The evaluation results are shown in Table 5.

As is clear from the results of Table 5, similar to the case of Examples 1-1 to 1-4, in the secondary batteries of Examples 5-1 to 5-4 each containing polyacrylonitrile in a mass ratio of not more than 4.9 in the binder of the negative electrode, the solid content was high, and the electrode cracking could be prevented from occurring. On the other hand, in Comparative Example 5-1 not containing polyacrylonitrile at all, though the electrode cracking was not generated, the results revealed that the solid content was markedly low. Also, in Comparative Examples 5-2 to 5-6 each containing polyacrylonitrile in a mass ratio of 5 or more, the solid content was low, and the electrode cracking was generated.

Examples 6-1 to 6-4 and Comparative Examples 6-1 to 6-6

Non-aqueous electrolyte secondary batteries were each prepared in the same manner as in Example 1-1, etc., except for regulating the content of the binder of the negative electrode at 8% by mass. The evaluation results are shown in Table 6.

TABLE 5

| | Binder (6.5% by mass) | | Surface density per both surfaces of negative electrode (mg/cm$^2$) | Negative electrode active material | Solid content of negative electrode mixture slurry (%) | Electrode cracking | Capacity retention rate after 200 cycles (%) |
| | PVdF/PAN | PVdF (% by mass) | PAN (% by mass) | | | | | |
|---|---|---|---|---|---|---|---|---|
| Example 5-1 | 99.9/0.1 | 6.4935 | 0.0065 | 20 | Artificial graphite | 68 | No | 96 |
| Example 5-2 | 99/1 | 6.435 | 0.065 | 20 | Artificial graphite | 69 | No | 95 |
| Example 5-3 | 96/4 | 6.24 | 0.26 | 20 | Artificial graphite | 70 | No | 95 |
| Example 5-4 | 95.1/4.9 | 6.1815 | 0.3185 | 20 | Artificial graphite | 69 | No | 95 |
| Comparative Example 5-1 | 100/0 | 6.5 | 0 | 20 | Artificial graphite | 49 | No | 90 |
| Comparative Example 5-2 | 95/5 | 6.175 | 0.325 | 20 | Artificial graphite | 61 | Yes | 96 |
| Comparative Example 5-3 | 80/20 | 5.2 | 1.3 | 20 | Artificial graphite | 59 | Yes | 96 |
| Comparative Example 5-4 | 50/50 | 3.25 | 3.25 | 20 | Artificial graphite | 59 | Yes | 96 |
| Comparative Example 5-5 | 20/80 | 1.3 | 5.2 | 20 | Artificial graphite | 59 | Yes | 96 |
| Comparative Example 5-6 | 0/100 | 0 | 6.5 | 20 | Artificial graphite | 59 | Yes | 72 |

TABLE 6

| | Binder (8% by mass) | | | Surface density per both surfaces of negative electrode (mg/cm$^2$) | Negative electrode active material | Solid content of negative electrode mixture slurry (%) | Electrode cracking | Capacity retention rate after 200 cycles (%) |
| --- | --- | --- | --- | --- | --- | --- | --- | --- |
| | PVdF/PAN | PVdF (% by mass) | PAN (% by mass) | | | | | |
| Example 6-1 | 99.9/0.1 | 7.992 | 0.008 | 20 | Artificial graphite | 67 | No | 71 |
| Example 6-2 | 99/1 | 7.92 | 0.08 | 20 | Artificial graphite | 68 | No | 71 |
| Example 6-3 | 96/4 | 7.68 | 0.32 | 20 | Artificial graphite | 69 | No | 71 |
| Example 6-4 | 95.1/4.9 | 7.608 | 0.392 | 20 | Artificial graphite | 68 | No | 71 |
| Comparative Example 6-1 | 100/0 | 8 | 0 | 20 | Artificial graphite | 48 | No | 65 |
| Comparative Example 6-2 | 95/5 | 7.6 | 0.4 | 20 | Artificial graphite | 60 | Yes | 71 |
| Comparative Example 6-3 | 80/20 | 6.4 | 1.6 | 20 | Artificial graphite | 58 | Yes | 71 |
| Comparative Example 6-4 | 50/50 | 4 | 4 | 20 | Artificial graphite | 58 | Yes | 70 |
| Comparative Example 6-5 | 20/80 | 1.6 | 6.4 | 20 | Artificial graphite | 58 | Yes | 70 |
| Comparative Example 6-6 | 0/100 | 0 | 8 | 20 | Artificial graphite | 58 | Yes | 60 |

As is clear from the results of Table 6, similar to the case of Examples 1-1 to 1-4, in the secondary batteries of Examples 6-1 to 6-4 each containing polyacrylonitrile in a mass ratio of not more than 4.9 in the binder of the negative electrode, the solid content was high, and the electrode cracking could be prevented from occurring. On the other hand, in Comparative Example 6-1 not containing polyacrylonitrile at all, though the electrode cracking was not generated, the results revealed that the solid content was markedly low. Also, in Comparative Examples 6-2 to 6-6 each containing polyacrylonitrile in a mass ratio of 5 or more, the solid content was low, and the electrode cracking was generated.

Also, as is clear from the results of Tables 1 to 6, in the case where the content of the binder, namely the content of polyvinylidene fluoride and polyacrylonitrile is 1% by mass or 8% by mass, the cycle characteristic was lowered. It was noted from this matter that the total content of polyvinyl fluoride and polyacrylonitrile relative to the negative electrode mixture is preferably from 2 to 6.5% by mass.

Examples 7-1 to 7-5

Non-aqueous electrolyte secondary batteries were each prepared in the same manner as in Example 4-3, etc., except for changing the surface density of the negative electrode. The evaluation results are shown in Table 7.

TABLE 7

| | Binder (5% by mass) | | | Surface density per both surfaces of negative electrode (mg/cm$^2$) | Negative electrode active material | Solid content of negative electrode mixture slurry (%) | Electrode cracking | Capacity retention rate after 200 cycles (%) |
| --- | --- | --- | --- | --- | --- | --- | --- | --- |
| | PVdF/PAN | PVdF (% by mass) | PAN (% by mass) | | | | | |
| Example 7-1 | 96/4 | 4.8 | 0.2 | 5 | Artificial graphite | 68 | No | 95 |
| Example 7-2 | 96/4 | 4.8 | 0.2 | 8 | Artificial graphite | 69 | No | 95 |
| Example 7-3 | 96/4 | 4.8 | 0.2 | 10 | Artificial graphite | 68 | No | 95 |
| Example 4-3 | 96/4 | 4.8 | 0.2 | 20 | Artificial graphite | 70 | No | 95 |
| Example 7-4 | 96/4 | 4.8 | 0.2 | 25 | Artificial graphite | 69 | No | 95 |
| Example 7-5 | 96/4 | 4.8 | 0.2 | 30 | Artificial graphite | 68 | No | 95 |

As is clear from the results of Table 7, at any of the surface densities, the solid content was high, and electrode cracking was not generated. Furthermore, a high cycle characteristic could be kept.

Examples 8-1 to 8-3

Non-aqueous electrolyte secondary batteries were each prepared in the same manner as in Example 4-3, except for changing the negative electrode active material. The evaluation results are shown in Table 8.

TABLE 8

| | Binder (5% by mass) | | | Surface density per both surfaces of negative electrode (mg/cm$^2$) | Negative electrode active material | Solid content of negative electrode mixture slurry (%) | Electrode cracking | Capacity retention rate after 200 cycles (%) |
|---|---|---|---|---|---|---|---|---|
| | PVdF/PAN | PVdF (% by mass) | PAN (% by mass) | | | | | |
| Example 4-3 | 96/4 | 4.8 | 0.2 | 20 | Artificial graphite | 70 | No | 95 |
| Example 8-1 | 96/4 | 4.8 | 0.2 | 20 | Natural graphite | 68 | No | 94 |
| Example 8-2 | 96/4 | 4.8 | 0.2 | 20 | Easily graphitized carbon | 69 | No | 94 |
| Example 8-3 | 96/4 | 4.8 | 0.2 | 20 | Hardly graphitized carbon | 68 | No | 93 |

As is clear from the results of Table 8, in any of the negative electrode active materials, the solid content was high, and electrode cracking was not generated. Furthermore, a high cycle characteristic could be kept.

Comparative Examples 9-1 to 9-9

Non-aqueous electrolyte secondary batteries were each prepared in the same manner as in Example 4-3, except for adding polyvinylidene fluoride and polyacrylonitrile as a binder of the positive electrode as shown in Table 9. The evaluation results are shown in Table 9.

TABLE 9

| | Binder (5% by mass) | | | Surface density per both surfaces of negative electrode (mg/cm$^2$) | Positive electrode active material | Solid content of negative electrode mixture slurry (%) | Electrode cracking | Capacity retention rate after 200 cycles (%) |
|---|---|---|---|---|---|---|---|---|
| | PVdF/PAN | PVdF (% by mass) | PAN (% by mass) | | | | | |
| Comparative Example 9-1 | 100/0 | 5 | 0 | 20 | Lithium cobaltate | 65 | No | 96 |
| Comparative Example 9-2 | 99.9/0.1 | 4.995 | 0.005 | 20 | Lithium cobaltate | 66 | No | 95 |
| Comparative Example 9-3 | 99/1 | 4.95 | 0.05 | 20 | Lithium cobaltate | 66 | No | 95 |
| Comparative Example 9-4 | 95.1/4.9 | 4.755 | 0.245 | 20 | Lithium cobaltate | 66 | No | 95 |
| Comparative Example 9-5 | 95/5 | 4.75 | 0.25 | 20 | Lithium cobaltate | 67 | Yes | 95 |
| Comparative Example 9-6 | 80/20 | 4 | 1 | 20 | Lithium cobaltate | 66 | Yes | 95 |
| Comparative Example 9-7 | 50/50 | 2.5 | 2.5 | 20 | Lithium cobaltate | 66 | Yes | 95 |
| Comparative Example 9-8 | 20/80 | 1 | 4 | 20 | Lithium cobaltate | 66 | Yes | 95 |
| Comparative Example 9-9 | 0/100 | 0 | 5 | 20 | Lithium cobaltate | 67 | Yes | 72 |

As is clear from the results of Table 9, even when polyacrylonitrile was added as a binder of the positive electrode, the results revealed that an effect for increasing the solid content was not observed. It may be thought that different from the case of the negative electrode active material, in the positive electrode active material, an interaction with polyacrylonitrile is strong so that it does not affect the solid content. It may be thought that in the negative electrode, an interaction between the active material and polyacrylonitrile is weak so that the solid content increases due to an interaction between polyvinylidene fluoride and polyacrylonitrile.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte secondary battery comprising:
   a positive electrode;
   a negative electrode; and
   a non-aqueous electrolyte, wherein
   the negative electrode contains a negative electrode mixture containing a binder; and
   the binder contains polyvinylidene fluoride and polyacrylonitrile, with a mass ratio of polyvinylidene fluoride to polyacrylonitrile ranging from 99.9/0.1 to 95.1/4.9.

2. The non-aqueous electrolyte secondary battery according to claim 1, wherein the non-aqueous electrolyte is a gel non-aqueous electrolyte.

3. The non-aqueous electrolyte secondary battery according to claim 1, wherein the non-aqueous electrolyte contains at least a copolymer of vinylidene fluoride and hexafluoropropylene.

4. The non-aqueous electrolyte secondary battery according to claim 1, wherein a total content of the polyvinylidene fluoride and the polyacrylonitrile relative to the negative electrode mixture is from 2 to 6.5% by mass.

5. A negative electrode comprising:
a negative electrode mixture containing a binder, wherein the binder contains polyvinylidene fluoride and polyacrylonitrile, with a mass ratio of polyvinylidene fluoride to polyacrylonitrile ranging from 99.9/0.1 to 95.1/4.9.

6. The negative electrode according to claim 5, wherein a total content of the polyvinylidene fluoride and the polyacrylonitrile relative to the negative electrode mixture is from 2 to 6.5% by mass.

7. The non-aqueous electrolyte secondary battery according to claim 1, wherein the negative electrode mixture contains a negative electrode active material selected from the group consisting of artificial graphite, natural graphite, easily graphitized carbon and hardly graphitized carbon.

8. The negative electrode according to claim 5, wherein the negative electrode mixture contains a negative electrode active material selected from the group consisting of artificial graphite, natural graphite, easily graphitized carbon and hardly graphitized carbon.

* * * * *